US009711828B2

(12) United States Patent
Heise

(10) Patent No.: US 9,711,828 B2
(45) Date of Patent: Jul. 18, 2017

(54) HEAT SHRINK JOINING OF BATTERY CELL COMPONENTS

(71) Applicant: GM Global Technology Operations LLC, Detroit, MI (US)

(72) Inventor: Axel Heise, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 529 days.

(21) Appl. No.: 14/270,425

(22) Filed: May 6, 2014

(65) Prior Publication Data

US 2014/0242437 A1    Aug. 28, 2014

Related U.S. Application Data

(62) Division of application No. 13/035,236, filed on Feb. 25, 2011, now Pat. No. 8,771,382.

(51) Int. Cl.
| *H01M 10/613* | (2014.01) |
| *H01M 10/6554* | (2014.01) |
| *H01M 10/625* | (2014.01) |
| *H01M 10/0525* | (2010.01) |

(52) U.S. Cl.
CPC ..... *H01M 10/613* (2015.04); *H01M 10/0525* (2013.01); *H01M 10/625* (2015.04); *H01M 10/6554* (2015.04); *H01M 2220/20* (2013.01); *Y02E 60/122* (2013.01); *Y02P 70/54* (2015.11); *Y02T 10/7011* (2013.01); *Y10T 29/49108* (2015.01)

(58) Field of Classification Search
CPC .................................. H01M 10/6554–10/6555
See application file for complete search history.

(56) References Cited

U.S. PATENT DOCUMENTS

| 5,678,760 | A | * | 10/1997 | Muso | ..................... B60K 11/02 |
| | | | | | 165/41 |
| 8,383,260 | B2 | | 2/2013 | Essinger et al. | |
| 8,435,668 | B2 | | 5/2013 | Kumar et al. | |
| 8,704,485 | B1 | * | 4/2014 | Tsukamoto | ........... H01M 10/44 |
| | | | | | 320/112 |
| 2009/0208836 | A1 | * | 8/2009 | Fuhr | ..................... H01M 2/024 |
| | | | | | 429/158 |
| 2011/0052960 | A1 | * | 3/2011 | Kwon | ............... H01M 10/0481 |
| | | | | | 429/120 |

FOREIGN PATENT DOCUMENTS

WO    2010066637 A1    6/2010

OTHER PUBLICATIONS

"Calculations for Shrink Fitting." AmeriTherm, Inc. Retrieved from: http://www.ameritherm.com/PDFs/shrinkfitcalcs.pdf. Accessed on Jul. 1, 2013.*

* cited by examiner

*Primary Examiner* — Maria J Laios
*Assistant Examiner* — Robert S Carrico
(74) *Attorney, Agent, or Firm* — Quinn IP Law

(57) ABSTRACT

A cooling system for a battery cell includes at least one plate having at least one key, and a heat sink having at least one slot formed therein. The at least one key of the at least one plate is disposed in the at least one slot. The at least one plate and the heat sink form an interference fit joint securing the at least one plate to the heat sink.

18 Claims, 4 Drawing Sheets

HEAT SHRINK JOINING OF BATTERY CELL COMPONENTS

CROSS-REFERENCE TO RELATED APPLICATIONS

This Application is a divisional application of U.S. patent application Ser. No. 13/035,236 filed on Feb. 25, 2011.

FIELD OF THE INVENTION

The present disclosure relates to a battery pack and more particularly to a cooling system for the battery pack.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. For example, the battery cell may be prismatic in shape to facilitate a stacking of the battery cells. A plurality of individual battery cells can be provided in a battery pack to provide an amount of power sufficient to operate electric vehicles.

Typical prismatic battery cells have a pair of plastic coated metal layers fused around a periphery of the battery cell in order to seal the battery cell components. The sealing of the battery cells generally begin with providing one of the plastic coated metal layers with a cavity, sometimes called a "butter dish" shape. The battery cell components are disposed inside the cavity of the plastic coated metal layer. The other of the plastic coated metal layers is then placed on top of the battery cell components and fused at the periphery to the one of the plastic coated metal layers with the cavity, for example, by heat sealing around the edges. The battery cell for incorporation in the battery pack is thereby provided.

Battery cells such as lithium-ion battery cells are known to generate heat during operation and as a result of a charge cycle when recharging. When overheated or otherwise exposed to high-temperature environments, undesirable effects can impact the operation of lithium-ion batteries. Cooling systems are typically employed with lithium-ion batteries to militate against the undesirable overheating conditions. Known cooling systems for battery cells are described in Assignee's co-pending U.S. patent application Ser. No. 12/713,729 to Essinger et al. and U.S. patent application Ser. No. 12/842,478 to Kumar et al., the entire disclosures of which are hereby incorporated herein by reference.

Conventional cooling systems have included cooling plates or fins sandwiched between individual battery cells within the battery pack. The cooling fins are typically joined by "hot" methods such as brazing or welding to a heat sink. Hot joining methods can undesirably affect material microstructure, which can affect joint durability. Known joining methods also typically require filler material such as brazing solders, welding consumables, bonding adhesives, and thermal interface materials, which can undesirably affect thermal conductivity and increase manufacturing complexity.

There is a continuing need for a battery cooling system and a method for making the same that maximizes a durability at joints of the battery cooling system. Desirably, the battery cooling system and method does not require filler materials, facilitates a thermal conductivity from adjacent battery cells, and has a minimized manufacturing complexity.

SUMMARY OF THE INVENTION

In concordance with the instant disclosure, a battery cooling system and a method for making the same that maximizes a durability at joints of the battery cooling system, does not require filler materials, facilitates a thermal conductivity from adjacent battery cells, and has a minimized manufacturing complexity, is surprisingly discovered.

In a first embodiment, a cooling system for a battery cell includes at least one plate having at least one key, and a heat sink having at least one slot formed therein. The at least one key of the at least one plate is disposed in the at least one slot. The at least one plate and the heat sink form an interference fit joint securing the at least one plate to the heat sink.

In another embodiment, a method for manufacturing a cooling system for a battery cell includes the steps providing at least one plate having at least one key, and providing a heat sink having at least one slot formed therein. The heat sink is heated to a first temperature sufficient to thermally expand the heat sink and expand the at least one slot. The at least one key of the at least one plate is then inserted in the at least one slot. The heat sink is then cooled to a second temperature sufficient to thermally contract the heat sink and contract the at least one slot. An interference fit joint securing the at least one plate to the heat sink is thereby formed.

In a further embodiment, a method for manufacturing a cooling system for a battery cell includes the steps of providing at least one plate configured to be disposed adjacent the battery cell and transfer heat from the battery cell in operation, and providing a heat sink having at least one slot formed therein. The at least one plate has at least one terminal end. The at least one slot has a nominal width range at operating temperatures of the battery cell that is less than a nominal width range of the end of the at least one plate at the operating temperatures of the battery cell. The heat sink is heated to a first temperature sufficient to thermally expand the heat sink and expand the at least one slot to a first width greater than the nominal width range at operating temperatures of the battery cell. The terminal end of the at least one plate is inserted in the at least one slot. The heat sink is cooled to a second temperature sufficient to thermally contract the heat sink and contract the at least one slot to a second width within the nominal width range at operating temperatures of the battery cell. An interference fit joint securing the at least one plate to the heat sink is thereby formed.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
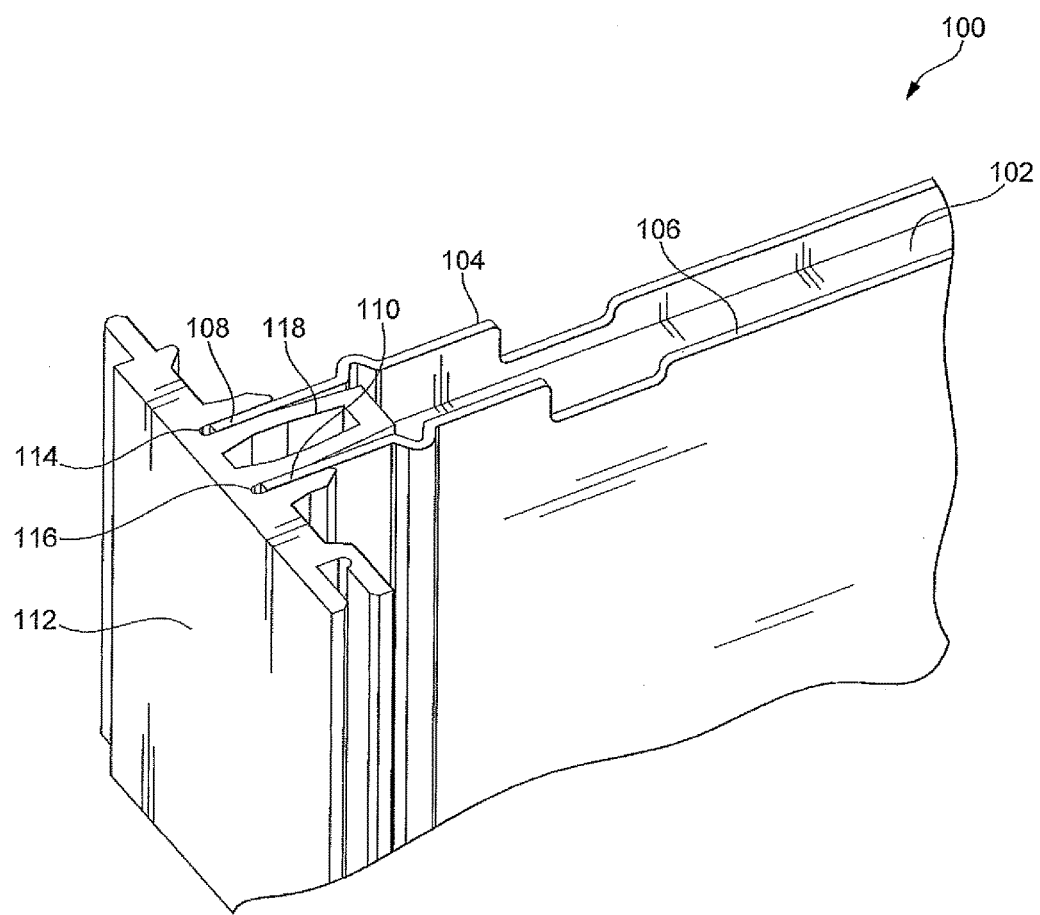
FIG. 1 is a fragmentary perspective view of a battery cell cooling system of the present disclosure, including a pair of cooling plates coupled to a heat sink.
Figure 2A:
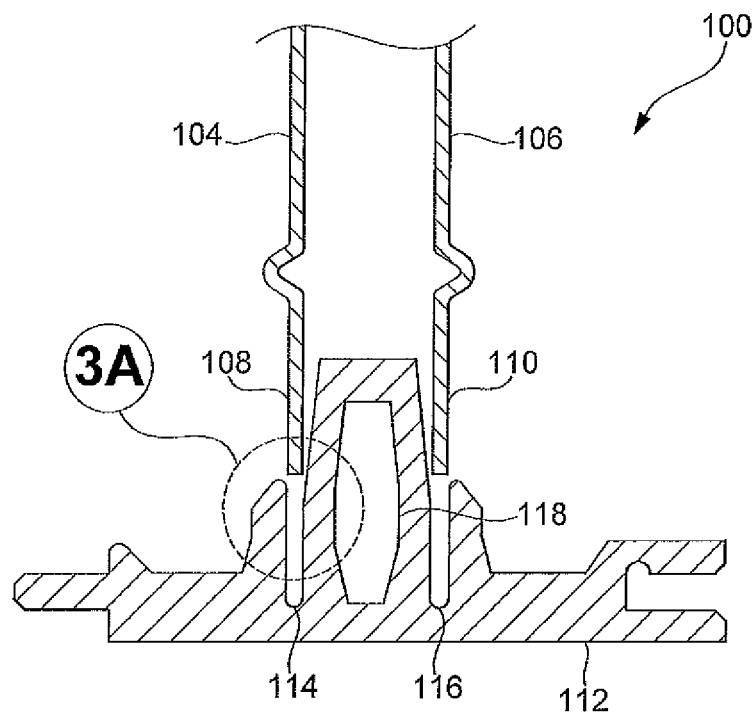
FIGS. 2A-2C are fragmentary cross sectional plan views illustrating a method for manufacturing the battery cell cooling system shown in FIG. 1.
Figure 2B:
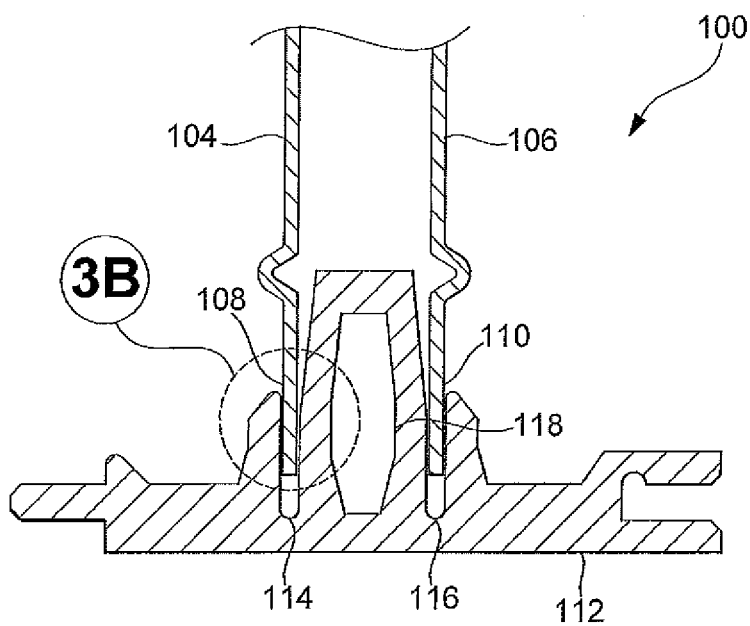
Figure 2C:
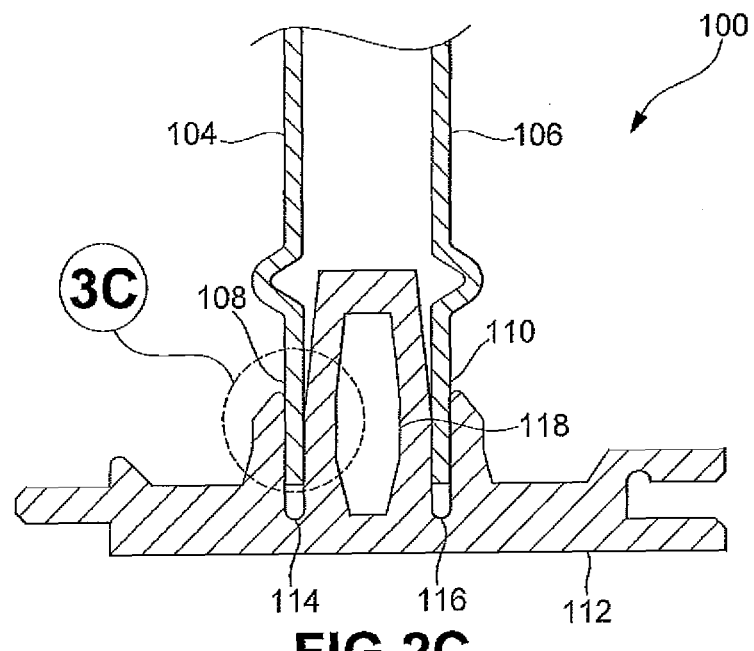
Figure 3A:
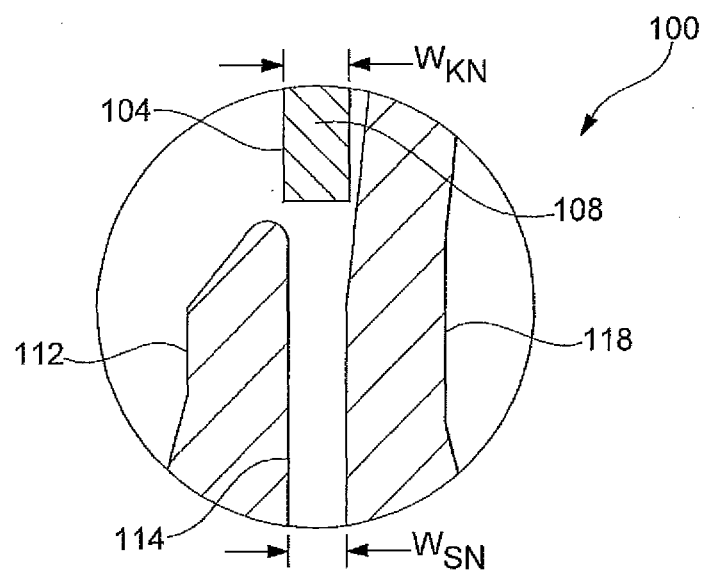
FIGS. 3A-3C are enlarged fragmentary cross sectional plan views illustrating the method for manufacturing the battery cell cooling system, identified by callouts 3A, 3B, and 3C in FIGS. 2A-2C, respectively.
Figure 3B:
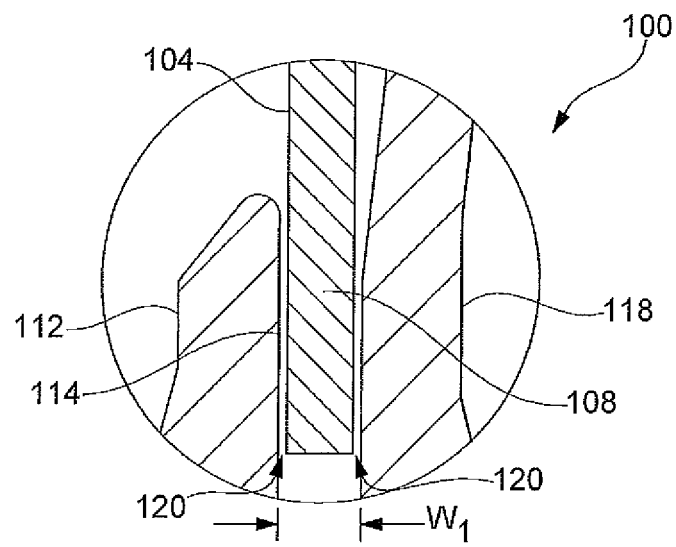
Figure 3C:
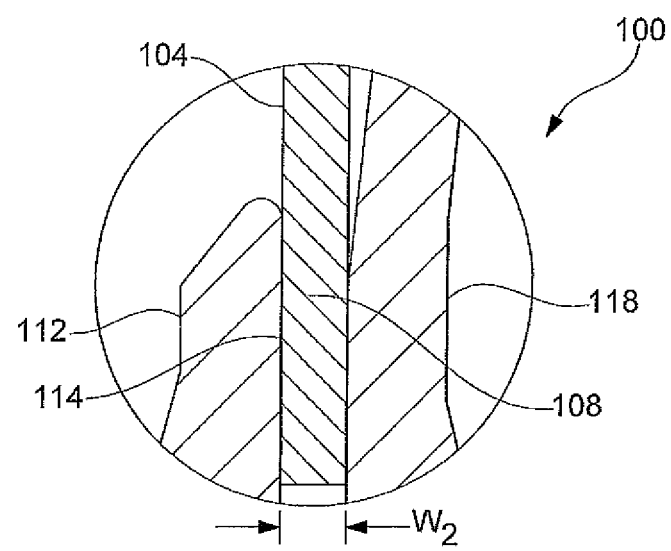

With reference to FIGS. 1, 2A-2C, and 3A-3C, a cooling system 100 for a battery cell 102 is shown. The battery cell 102 is configured to generate power from an electrochemical reaction. The battery cell 102 shown is a prismatic battery cell. As a nonlimiting example, the battery cell 102 may be a prismatic lithium ion (Li-ion) pouch cell. It should be appreciated that other types of the battery cells 102, employing a different structure and electrochemistry, may also be used within the scope of the present invention.

The cooling system 100 includes a pair of cooling plates 104, 106, each having at least one key 108, 110 formed thereon. The plates 104, 106 are configured to be disposed adjacent the battery cell 102. More or fewer plates can be used as desired. The plates 104, 106 function as a cooling fin of the cooling system 100, and transfer heat from the battery cell 102 during operation thereof. The plates 104, 106 may be formed from any material having a thermal conductivity suitable for transferring heat away from the battery cell 102. As a nonlimiting example, the plates 104, 106 may be formed from one of aluminum and steel. Thermally conductive composite materials may also be employed to form the plates 104, 106. One of ordinary skill in the art may select other suitable thermally conductive materials for the plates 104, 106, as desired.

The cooling system 100 also includes a heat sink 112 having a pair of slots 114, 116 formed therein. More or fewer slots can be included as desired. The slots 114, 116 receive at least one key 108, 110 of the plates 104, 106. The heat sink 112 is also configured to transfer heat away from the battery cell 102 during the operation thereof. As with the plates 104, 106, the heat sink 112 may be formed from any material having a thermal conductivity suitable for transferring heat away from the battery cell 102. The heat sink 112 is also formed from a material that exhibits desirable thermal expansion and contraction characteristics, based upon a predetermined temperature range of the heat sink 112. For example, the heat sink 112 may be an extruded metal foot formed from one of aluminum and steel. Other suitable thermally conductive materials for the heat sink 112, exhibiting sufficient thermal expansion and contraction with temperature, may also be selected within the scope of the present disclosure.

The at least one key 108, 110 of the plates 104, 106 forms an interference fit joint, also known as a "solid press fit joint", with the slots 114, 116. The interference fit joint of the at least one key 108, 110 of the plates 104, 106 and the heat sink 112 is substantially free of a filler material such as brazing solders, welding consumables, bonding adhesives, and thermal interface materials, as are known in the art. It should be appreciated that the known filler materials would otherwise affect thermal conductivity at the interference fit joint. An efficient transfer of heat from the plates 104, 106 to the heat sink 112 during the operation of the battery cell 102 is provided by the interference fit joint.

In certain examples, the at least one key 108, 110 is a terminal end of plates 104, 106. The terminal end of the plates 104, 106 may be shaped to facilitate the secure connection between the plates 104, 106 and the heat sink 112. For example, an edge surface of the at least one key 108, 110 and the slots 114, 116 may have alternating and opposing peaks and valleys (not shown) in order to provide a tongue and groove connection of the plates 104, 106 and the heat sink 112. Side surfaces of the at least one key 108, 110 and the slots 114, 116, shown planar in FIGS. 1, 2A-2C, and 3A-3C, may alternatively be at least one of beveled and textured in order to further enhance a friction-based connection between the at least one key 108, 110 and the heat sink 112. A skilled artisan may select suitable shapes, surface textures, and dimensions of the at least one key 108, 110 and the slots 114, 116, as desired.

In a particular embodiment, the plates 104, 106 include a first plate 104 with a first key 108, and a second plate 106 with a second key 110. The slots 114, 116 of the heat sink 112 also include a first slot 114 and a second slot 116. The first key 108 of the first plate 104 is disposed in the first slot 114. The second key 110 of the second plate 106 is disposed in the second slot 116. In other embodiments, the heat sink 112 may further include a conduit 118 permitting a cooling fluid to flow therethrough during operation of the cooling system 100. Where the conduit 118 is present, the first slot 114 may be formed in the heat sink 112 on one side of the conduit 118, and the second slot 116 may be formed in the heat sink 112 on another side of the conduit 118. Other arrangements of the slots 114, 116 within the heat sink 112 may also be employed.

As shown in FIGS. 2A-2B and 3A-3B, the present disclosure includes a heat shrinking method of manufacturing the cooling system 100. In the method of the present disclosure, the at least one key 108, 110 of the plates 104, 106 is inserted or otherwise disposed in the slots 114, 116 while the slots 114, 116 are expanded by a thermal expansion of the heat sink 112 in which the slots 114, 116 are formed. The slots 114, 116 may have a nominal width range ($W_{SN}$) at operating temperatures of the battery cell 102 that is less than a nominal width range ($W_{KN}$) of the at least one key 108, 110 at the operating temperatures of the battery cell 102. The heat sink 112 is heated above the operating temperatures of the battery cell 102 to increase a width of the slots 114, 116 to a point where the at least one key 108, 110 may be inserted. A gap 120 may exist between the at least one key 108, 110 and the slots 114, 116 while the slots 114, 116 are expanded, for example.

Upon a cooling of the heat sink 112, and a thermal contraction of the heat sink 112 and resulting contraction of the slots 114, 116 formed therein, the interference fit joint securing the plates 104, 106 to the heat sink 112 is formed. The interference fit joint provides a solid joint connection of the plates 104, 106 and the heat sink 112 at all operating temperatures of the battery cell 102.

Illustratively, the method for manufacturing the cooling system 100 for the battery cell 102 first includes the steps of providing the plates 104, 106 having the at least one key 108, 110, and providing the heat sink 112 having the slots 114, 116 formed therein. The heat sink 112 is then heated to a first temperature ($T_1$) sufficient to thermally expand the heat sink 112, resulting in an expansion of the slots 114, 116. The first temperature ($T_1$) is sufficient to expand the slots 114, 116 to a first width ($W_1$) greater than the nominal width range ($W_{SN}$) at operating temperatures of the battery cell 102. As a nonlimiting example, the first temperature ($T_1$) is greater than about 100° C. The at least one key 108, 110 of the plates 104, 106 is then inserted in the respective slot 114, 116. The heat sink 112 is subsequently cooled to a second temperature ($T_2$) sufficient to thermally contract the heat sink 112, resulting in a contraction of the slots 114, 116 to form the interference fit joint securing the plates 104, 106 to the heat sink 112. The second temperature ($T_2$) is sufficient to contract the slots 114, 116 to a second width ($W_2$) within the nominal width range ($W_{SN}$) at the operating temperatures of the battery cell 102. As a nonlimiting example, the second temperature ($T_2$) is about 20° C. A skilled artisan should understand that the heat sink 112 may be heated and cooled to other suitable temperatures to effectively heat shrink the heat sink 112 and form the interference fit joint with the plates 104, 106, as desired.

Where the plates 104, 106 include the first plate 104 and the second plate 106, the method may include the steps of disposing the first key 108 of the first plate 104 in the first slot 114 and disposing the second key 110 of the second plate 106 in the second slot 116. The first plate 104 and the second plate 106 may be inserted sequentially or simultaneously. The heat shrinking of the heat sink 112 to form the interference fit joint with the first plate 104 and the second plate 106 may also be performed sequentially or simultaneously, as desired.

Following the manufacturing of the cooling system 100, the plates 104, 106 may be disposed adjacent the battery cell 102. For example, the plates 104, 106 may abut the battery cell 102, and thereby transfer heat from the battery cell 102 in operation. It should be appreciated that a plurality of the plates 104, 106 may be employed between a plurality of the battery cells 102, which are disposed in a stack and form a battery pack suitable for operation of an electric vehicle.

Advantageously, the present cooling system 100 and heat shrinking method for manufacturing the cooling system 100 provide certain manufacturing and performance benefits. The manufacturing benefits may include a minimized number of manufacturing steps due to an elimination of conventional hot joining methods such as brazing and welding, and associated filler materials. One performance benefit is a minimized system weight, due to the absence of associated filler materials such as soldering or brazing materials and adhesives. A durability of the materials forming the plates 104, 106 and the heat sink 112, which can be affected by a heat history of the same, is further maximized by avoiding the use of brazing and welding processes. The desired thermal conductivity of the plates 104, 106 to the heat sink 112 is also surprisingly provided by the heat shrinking manufacturing method and resulting interference fit joint of the present disclosure.

While certain representative embodiments and details have been shown for purposes of illustrating the invention, it will be apparent to those skilled in the art that various changes may be made without departing from the scope of the disclosure, which is further described in the following appended claims.

What is claimed is:

1. A cooling system for a battery cell, comprising:
   at least one plate having at least one key; and
   a heat sink having at least one slot formed therein, the at least one key of the at least one plate disposed in the at least one slot to form an interference fit joint securing the at least one plate to the heat sink;
   wherein the at least one plate includes a first plate with a first key and a second plate with a second key, the at least one slot of the heat sink includes a first slot and a second slot, the first key of the first plate disposed in the first slot and the second key of the second plate disposed in the second slot, the heat sink includes a conduit permitting a cooling fluid to flow therethrough, the first slot formed in the heat sink on one side of the conduit and the second slot formed in the heat sink on another side of the conduit, and the first slot and the second slot extend parallel with the conduit.

2. The cooling system of claim 1, wherein the at least one plate is disposed adjacent the battery cell and transfers heat from the battery cell in operation.

3. The cooling system of claim 1, wherein the at least one slot has a nominal width range at operating temperatures of the battery cell that is less than a nominal width range of the at least one key of the at least one plate at the operating temperatures of the battery cell.

4. The cooling system of claim 1, wherein the interference fit joint securing the at least one plate to the heat sink is substantially free of a filler material between the at least one plate and the heat sink.

5. The cooling system of claim 1, wherein the interference fit joint securing the at least one plate to the heat sink is substantially free of an adhesive.

6. The cooling system of claim 1, wherein the at least one key includes terminal end of the at least one plate.

7. The cooling system of claim 1, wherein the heat sink is an extruded metal foot.

8. The cooling system of claim 1, wherein each of the at least one plate and the heat sink is formed from at least one of aluminum and steel.

9. The cooling system of claim 1, wherein the at least one plate is formed of a thermally conductive composite material.

10. A cooling system for a battery cell, comprising:
    a heat sink having at least one slot formed therein, wherein the heat sink includes a conduit permitting cooling fluid to flow therethrough, and the at least one slot formed in the heat sink adjacent the conduit, wherein the at least one slot extends parallel with the conduit; and
    at least one heat plate having at least one key, the key removably disposed within the at least one slot of the heat sink adjacent the conduit, wherein a first width of the at least one slot is less than a nominal width range of the key when the heat sink is at a first temperature, and a second width of the at least one slot is greater than the nominal width range of the key at a second temperature, and wherein a gap exists between at least one of an inner wall surface of the slot and the conduit when the key is inserted into the at least one slot at the second temperature, and an interference joint is formed between the at least one of the inner wall surface of the slot and the conduit when the key is inserted into the at least one slot at the first temperature.

11. The cooling system of claim 10, wherein the at least one plate is disposed adjacent and in thermal communication with the battery cell.

12. The cooling system of claim 10, wherein the at least one slot has a nominal width range at operating temperatures of the battery cell that is less than a nominal width range of the at least one key of the at least one plate at the operating temperatures of the battery cell.

13. The cooling system of claim 10, wherein the first temperature is greater than about 100° C.

14. The cooling system of claim 10, wherein the second temperature is about 20° C.

15. The cooling system of claim 10, wherein the at least one plate includes a first plate with a first key and a second plate with a second key, and the at least one slot of the heat sink includes a first slot and a second slot, and the first key of the first plate is disposed in the first slot and the second key of the second plate is disposed in the second slot.

16. The cooling system of claim 10, wherein the at least one slot of the heat sink includes a first slot and a second slot, the first slot formed in the heat sink on a first side of the conduit and the second slot formed in the heat sink on a second side of the conduit.

17. The cooling system of claim 10, wherein each of the at least one plate and the heat sink is formed from at least one of aluminum and steel.

18. A cooling system for a battery cell comprising:
   at least one plate disposed adjacent the battery cell, wherein the plate is in thermal communication with the battery cell, the at least one plate having at least one terminal end; and
   a heat sink having a least one slot formed therein, wherein the heat sink includes a conduit for permitting a cooling fluid to flow therethrough, and the at least one slot of the heat sink formed in the heat sink adjacent the conduit has a nominal width range at operating temperatures of the battery cell that is less than a nominal width range of the terminal end of the at least one plate at the operating temperature of the battery cell, and wherein the at least one terminal end of the at least one plate is inserted in the at least one slot adjacent the conduit and an interference fit joint is formed with the terminal end of the at least one plate and the at least one slot, wherein the at least one slot of the heat sink includes a first slot and a second slot, the first slot formed in the heat sink adjacent one side of the conduit and the second slot formed in the heat sink adjacent another side of the conduit, wherein the at least one slot extends parallel with the conduit.

* * * * *